(12) United States Patent
Klock et al.

(10) Patent No.: US 11,941,740 B2
(45) Date of Patent: Mar. 26, 2024

(54) SYSTEM, DEVICES AND/OR PROCESSES FOR GRAPHICS VERTEX PROCESSING

(71) Applicant: Arm Limited, Cambridge (GB)

(72) Inventors: Michael Martin Klock, Austin, TX (US); Philip Carlos Garcia, Austin, TX (US); Frank Klaeboe Langtind, Melhus (NO); Peter Anthony Hearne, Milton Keynes (GB)

(73) Assignee: Arm Limited, Cambridge (GB)

( * ) Notice: Subject to any disclaimer, the term of this patent is extended or adjusted under 35 U.S.C. 154(b) by 129 days.

(21) Appl. No.: 17/511,261

(22) Filed: Oct. 26, 2021

(65) Prior Publication Data

US 2023/0132068 A1    Apr. 27, 2023

(51) Int. Cl.
G06T 1/20    (2006.01)
G06T 1/60    (2006.01)
G06T 15/00   (2011.01)

(52) U.S. Cl.
CPC .............. *G06T 15/005* (2013.01); *G06T 1/20* (2013.01); *G06T 1/60* (2013.01)

(58) Field of Classification Search
CPC ........... G06T 1/20; G06T 1/60; G06T 15/005; G06T 15/80
USPC .................................................. 345/426, 557
See application file for complete search history.

(56) References Cited

U.S. PATENT DOCUMENTS

2016/0196633 A1*  7/2016  Charles .................. G06F 12/02
                                                          345/557
2017/0193691 A1*  7/2017  Langtind ................. G06T 15/80

* cited by examiner

*Primary Examiner* — Jacinta M Crawford
(74) *Attorney, Agent, or Firm* — Berkeley Law & Technology Group, LLP

(57) ABSTRACT

Disclosed subject matter relates generally to graphics processing, and relates more particularly to processing graphics vertex content.

19 Claims, 11 Drawing Sheets

SYSTEM, DEVICES AND/OR PROCESSES FOR GRAPHICS VERTEX PROCESSING

BACKGROUND

Field

The present disclosure relates generally to graphics processing, and relates more particularly to processing graphics vertex content.

Information

In today's world of electronic device types such as, for example, server computing systems, desktop computing devices, laptop and/or notebook computing devices, tablet devices, cellular telephones, televisions, set-top boxes, gaming consoles, etc., there appears to be a trend towards processing larger and larger amounts of graphics content resulting in a desire to implement graphics processing pipelines in processors, such as graphics processing units (GPU), to handle the increased loads. For example, display devices (e.g., televisions, computer monitors, touchscreens, etc.) continue to increase in resolution and computer graphics images continue to increase in sophistication and/or complexity. These factors, and others, may result in relatively large amounts of graphics content (e.g., graphics primitives) being generated. Significant challenges may arise in designing and/or implementing systems and/or devices, such as GPUs, to process such relatively large amounts of graphics content sufficiently quickly and/or efficiently.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
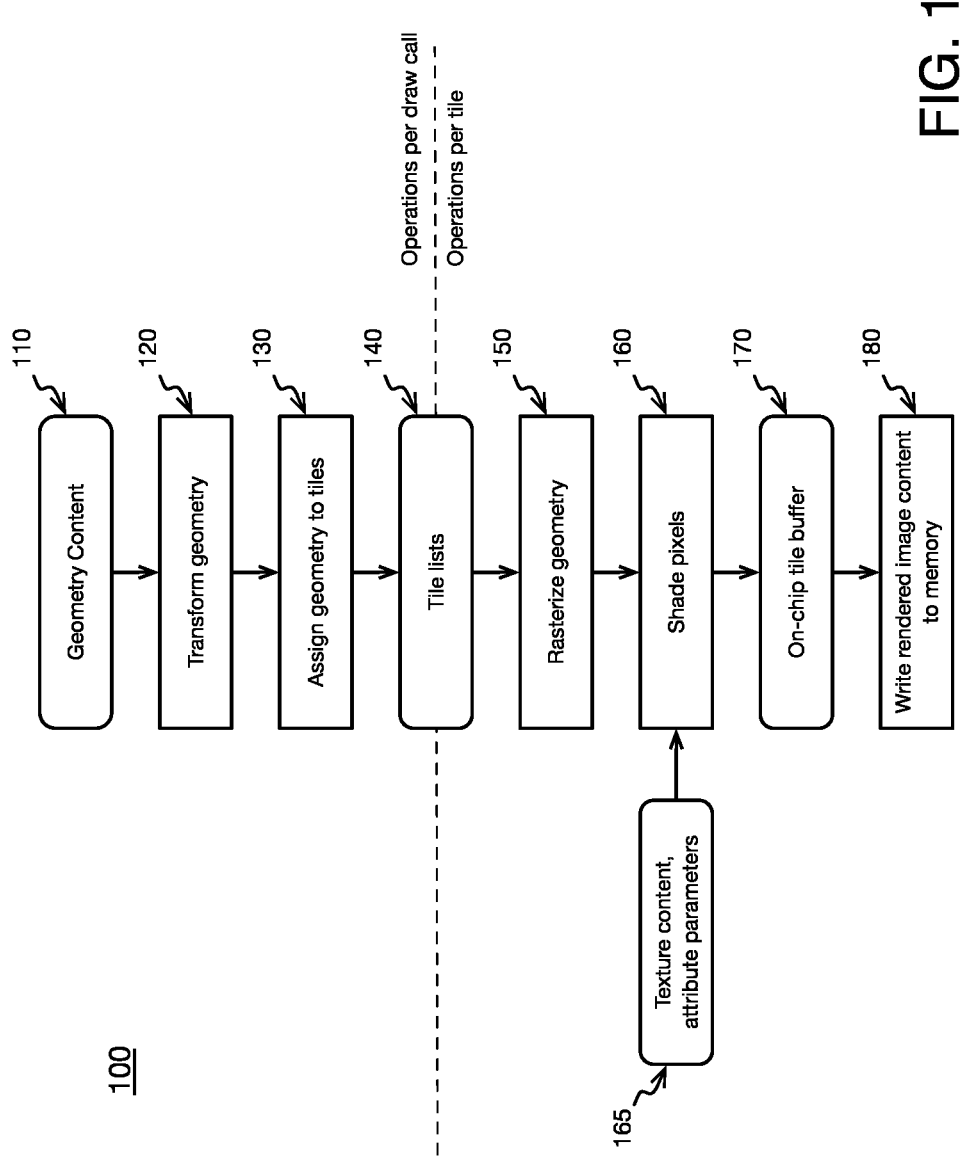
FIG. 1 is a flow diagram depicting an example process for graphics content processing, in accordance with embodiments.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents. Further, it is to be understood that other embodiments may be utilized. Also, embodiments have been provided of claimed subject matter and it is noted that, as such, those illustrative embodiments are inventive and/or unconventional; however, claimed subject matter is not limited to embodiments provided primarily for illustrative purposes. Thus, while advantages have been described in connection with illustrative embodiments, claimed subject matter is inventive and/or unconventional for additional reasons not expressly mentioned in connection with those embodiments. In addition, references throughout this specification to "claimed subject matter" refer to subject matter intended to be covered by one or more claims, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned, in today's electronic device types such as, for example, server computing systems, desktop computing devices, laptop and/or notebook computing devices, tablet devices, cellular telephones, televisions, set-top boxes, gaming consoles, etc., there appears to be a trend towards processing larger and larger amounts of graphics content resulting in a desire to design and/or implement graphics processing pipelines in processors, such as graphics processing units (GPU), to handle the increased loads. For example, display devices (e.g., televisions, computer monitors, touchscreens, etc.) continue to increase in resolution and/or computer graphics images continue to increase in sophistication and/or complexity. These factors and/or others may result in relatively large amounts of graphics content (e.g., graphics primitives) being generated. Significant challenges may arise in designing and/or implementing systems and/or devices, such as GPUs, to process such relatively large amounts of graphics content sufficiently quickly and/or efficiently.

Figure 2:
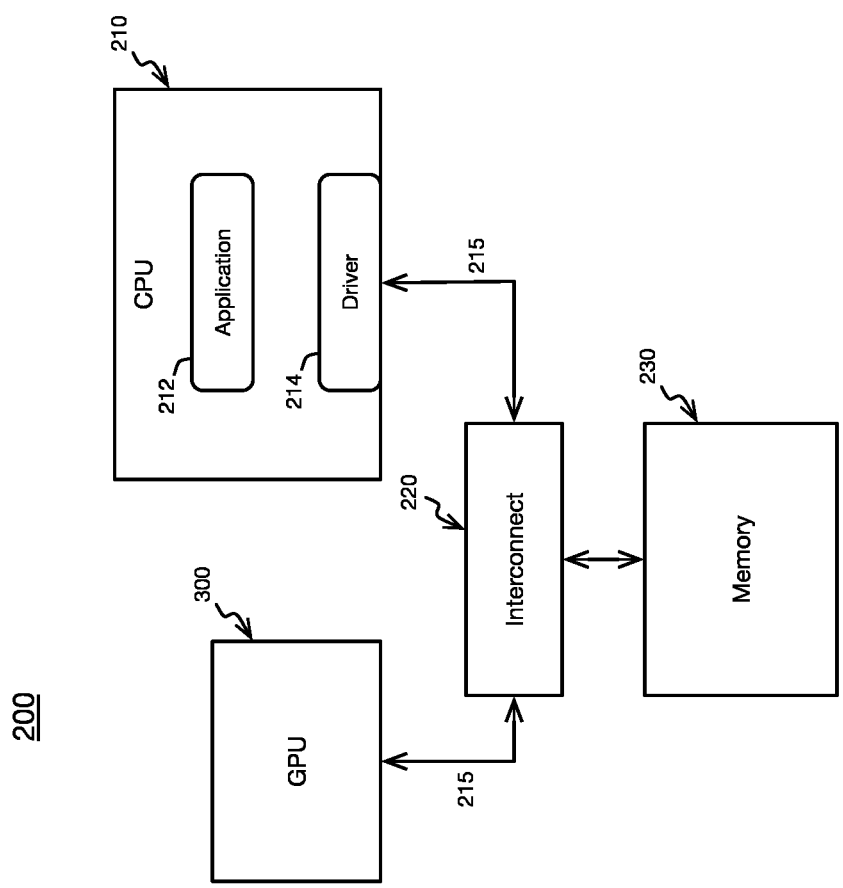
FIG. 2 is a schematic diagram depicting an example computing device including a graphics processing unit, in accordance with embodiments.

The following discussions related to FIG. 1 and FIG. 2 are generally intended to provide a foundation for more detailed discussions related to FIG. 3 through FIG. 11. For example, FIG. 1 depicts a flow diagram illustrating an example process 100 of an example graphics processing flow. Example graphics processing flow 100 may illustrate various example aspects of a general graphics processing flow, and is presented in large part to provide background for additional discussion to follow. Variations from this generalized example will also be discussed below.

Figure 3:
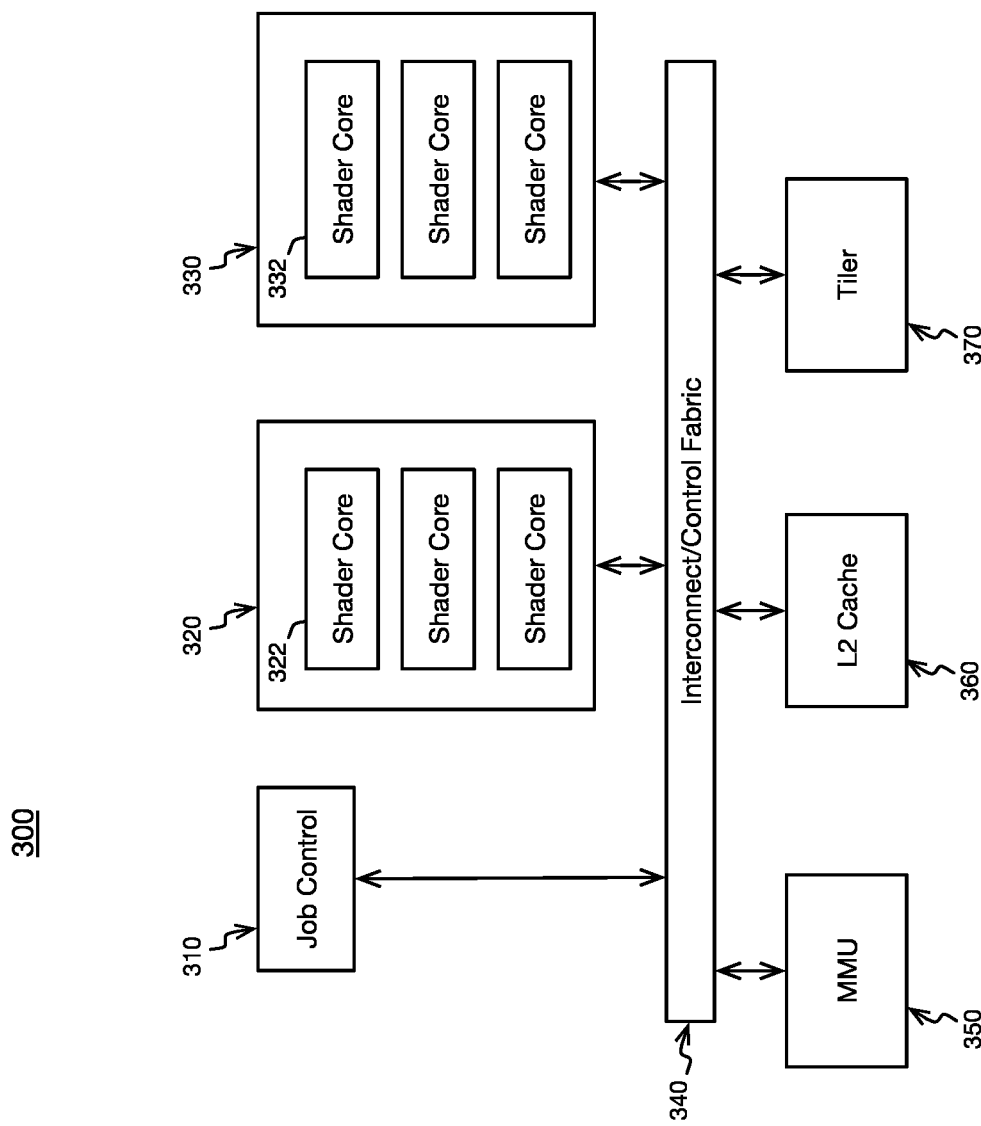
FIG. 3 is a schematic diagram illustrating an example graphics processing unit, in accordance with embodiments.

In implementations, example graphics processing flow 100 may be performed by one or more processors, such as at least one GPU, such as GPU 300 depicted in FIG. 2 and/or FIG. 3. It should be noted that content acquired or produced, such as, for example, input signals, output signals, operations, results, etc. associated with example process 100 may be represented via one or more digital signals. It should also be appreciated that even though one or more operations are illustrated or described concurrently or with respect to a certain sequence, other sequences or concurrent operations may be employed. In addition, although the description below references particular aspects and/or features, one or more operations may be performed with other aspects and/or features.

As depicted at block 110, graphics processing may begin with geometry content for a scene to be rendered. In an implementation, geometry content may be specified by way of a series of primitives (e.g., polygons) which may individually comprise a number (e.g., three) graphics vertices, for example. In an implementation, individual graphics vertices may comprise respective positional parameters to indicate a position in a three-dimensional space and/or may include other attribute content. In an implementation, vertices may be transformed from a three-dimensional space to a screen space and/or other vertex shading operations may be performed, as indicated at block 120. Further, as depicted at block 130, a graphics image may be subdivided into smaller portions (e.g., subdivided into tiles according to a grid) in screen space. Transformed geometry (e.g., primitives, vertices, etc.) may undergo tiling operations that may determine which primitives intersect particular tiles. Tile lists identifying particular primitives pertaining to respective tiles may be generated and stored in system memory, as indicated at block 140.

In some circumstances, operations 110 through 140 described above may be performed for primitives specified by one or more particular draw calls (e.g., commands and/or parameters related to processing and/or generation of a particular scene and/or image). In some implementations, primitives from multiple draw calls may be bundled into one or more tile lists. For example, draw calls from a particular render pass may be grouped together as far as tiling operations are concerned. Further, in some circumstances, graphics processing operations following tiling operation 130, such as operations 150 through 180 discussed below, may be performed on a per-tile basis although, as discussed more fully below, multiple tiles and/or other portions of an image may be processed substantially concurrently in some circumstances. For example, particular tiles may be assigned to difference shader cores within a GPU for processing, thereby allowing multiple tiles to be processed substantially concurrently.

As indicated at block 150, primitives pertaining to particular tiles may be rasterized to generate pixel fragments. As discussed in more detail below, in some implementations and/or in some circumstances, at least some vertex shading operations may be performed following tiling operations rather than during tiling operations in a process at times referred to as "deferred vertex shading." Further, as indicated at block 160, generated fragments may be shaded and/or otherwise rendered into image content. Fragment shading and/or rendering may include obtaining texture content and/or attribute parameters 165 from system memory in some circumstances. Additionally, for example, rendered image content may be written to a tile buffer, as indicated at block 170. Additionally, as indicated at block 180, rendered image content may be stored in a frame buffer for eventual display on a display device.

FIG. 2 is a schematic diagram depicting an embodiment 200 of an example computing device including at least one processor, such as CPU 210, and at least one graphics processing unit, such as GPU 300. In an implementation, a software and/or firmware application 212 (e.g., game application, digital image editing application, etc.) may be executed at least in part by processor 210. Also, in an implementation, processor 210 may provide commands and/or parameters 215 to GPU 200 via interconnect 220, for example. GPU 300, in an implementation, may include a graphics processing pipeline that may implement one or more operations described above in connection with FIG. 1 and/or described below in connection with FIGS. 4-11. For example, application 212 may generate application programming interface (API) calls that may be interpreted by a driver 214 corresponding to a graphics processing pipeline of GPU 300. In an implementation, driver 214 may be executed by processor 210 to generate appropriate commands and/or parameters (e.g., draw calls) 215 that may be provided to GPU 300. As mentioned, graphics content processing may often involve accesses to a system memory, such as memory 230. As utilized herein, "system memory" and/or the like refers to a memory location and/or device that is not local to a processor. Memory that is "local to a processor," "local to a graphics processor" and/or the like refers to memory circuitry located on the same die and/or within the same semiconductor package as the processor, graphics processor, etc.

In implementations, computing device 200 may comprise one or more desktop computers, server computers, game consoles, game controllers, extended reality (XR) devices (e.g., mixed reality, virtual reality and/or augmented reality devices), smart phones, tablet devices, watches, laptop and/or notebook computers, televisions, set-top boxes, etc., for example. Further, in implementations, computing device 200 may comprise a cloud-based computing device. "Cloud-based computing device" and/or the like refers to one or more networked remote server computing devices hosted on the Internet to store, manage and/or process content. Of course, subject matter is not limited in scope in these respects.

As may be noted from the discussion above, a number of operations related to vertex shading may involve accesses to system memory, such as memory 230. Due at least in part to latencies that may be incurred in accessing system memory, it may be advantageous to reduce the number of accesses to system memory in connection with vertex shading operations and/or to further improve the efficiency of vertex shading operations. As noted, and as discussed more fully below, some implementations may utilize deferred vertex shading, wherein at least some vertex shading operations may be performed following tiling operations in processes related to rasterization and fragment shading, for example. In implementations, deferred vertex shading operations may improve graphics processing efficiency and/or may help reduce the number of times system memory is accessed.

Another example technique for improving efficiency and/or reducing accesses to system memory is to reuse shaded vertices in some circumstances. For example, in situations in which different primitives share one or more vertices, vertices previously shaded in connection with one primitive may be reused in the context of another primitive rather than re-shading every vertex.

As discussed more fully below, to reduce the number of accesses to system memory and/or to further otherwise improve the efficiency of vertex shading operations, embodiments disclosed herein may include example systems, devices, processes, etc. in which the tracking of vertices and the reuse of vertices may be decoupled. For example, as discussed more fully below, one or more vertex buffers local to the GPU may be utilized to track a number of vertices during deferred vertex shading operations. As also discussed more fully below, one or more sliding window buffers local to the GPU (e.g., separate from the vertex buffers) may be utilized to track a number of most recently allocated vertices, in an implementation. In implementations, individual shader cores may comprise respective vertex buffers and/or respective sliding window buffers, as discussed more fully below. Vertex buffers may be segmented (e.g., multiple equally-sized segments). Therefore, a GPU, such as GPU 300, may include a number of vertex buffers and/or sliding window buffers, for example.

FIG. 3 is a schematic diagram illustrating an embodiment of an example GPU, such as GPU 300 introduced above in connection with FIG. 2. In an implementation, GPU 300 may include job control circuitry 310 which may receive commands and/or parameters (e.g., draw calls), such as commands and/or parameters 215, from a processor, such as processor 210, and/or may control, at least in part, draw calls and/or other graphics operations as they flow through GPU 300. Job control circuitry 310 may also, in particular implementations, be responsible for scheduling individual tiles to execute on one or more shader cores, such as shader cores 322 and/or 332, following tiling operations. GPU 300 may also include a memory management unit 350, a second-level cache 360, tiler circuitry 370 and/or shader stacks 320 and/or 330. In an implementation, various circuits and/or functional units of GPU 300 may be interconnected via one or more signals and/or one or more interconnects and/or control fabrics, such as interconnect/control fabric 340, for example. Implementations may include any of a very wide range of techniques, processes and/or circuits to provide and/or support communication among the various circuitry of a GPU, such as GPU 300.

Figure 5:
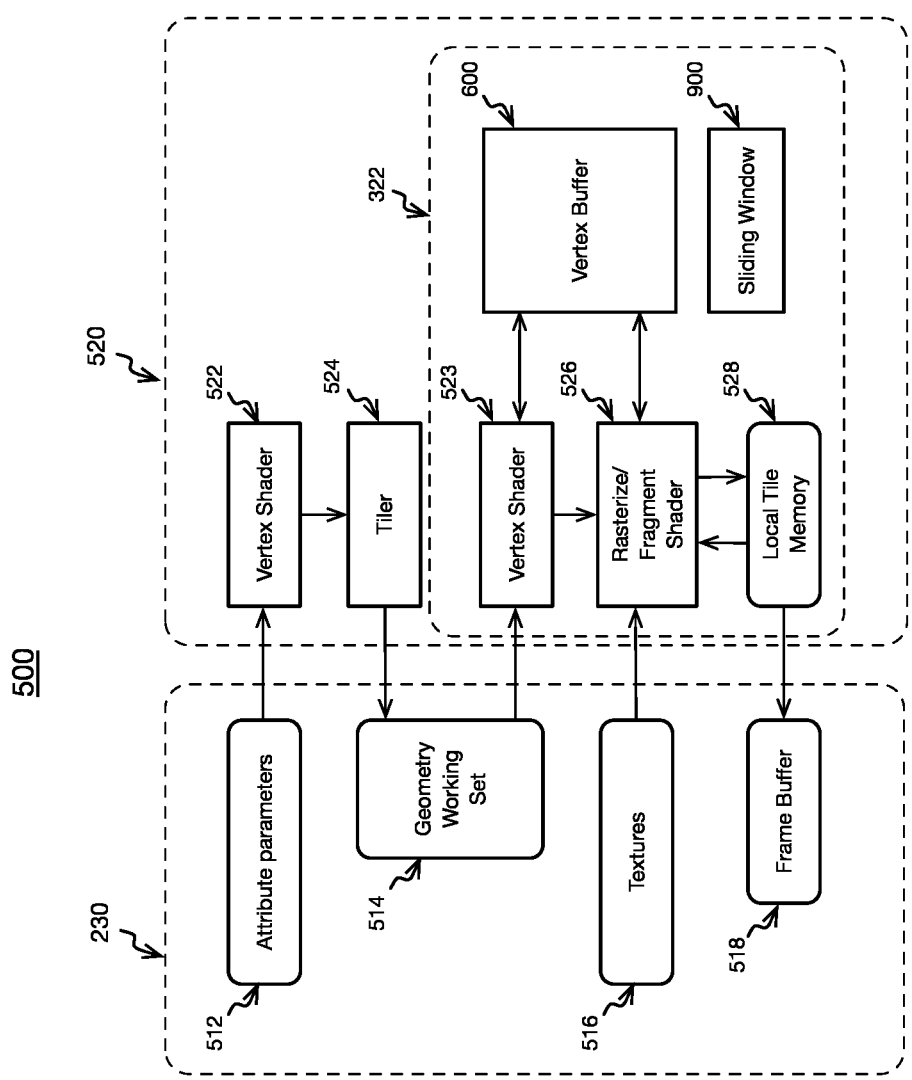
FIG. 5 is a diagram illustrating example interactions between a system memory and a graphics processing unit for graphics content processing including deferred vertex shading, in accordance with embodiments.

In an implementation, shader stacks 320 and/or 330 may individually comprise a number of shader cores, such as shader cores 322 and/or 332. Although three shader cores are depicted per shader stack, subject matter is not limited in this respect. For example, GPUs may include any number of shader stacks and/or individual shader cores. In implementations, individual shader cores may perform a number of operations, as discussed more fully below. Individual shader cores may also respectively include local cache memories that may sometimes be referred to as first level cache memories. In an implementation, cache memories for individual shader cores, such as shader cores 322 and/or 332, may respectively include vertex buffers and/or may further respectively include sliding window buffers. An example vertex buffer 600 is depicted in FIG. 5 and/or FIG. 6, discussed below. Further, an example sliding window buffer is depicted in FIG. 5 and/or FIG. 9, also discussed below.

Figure 4:
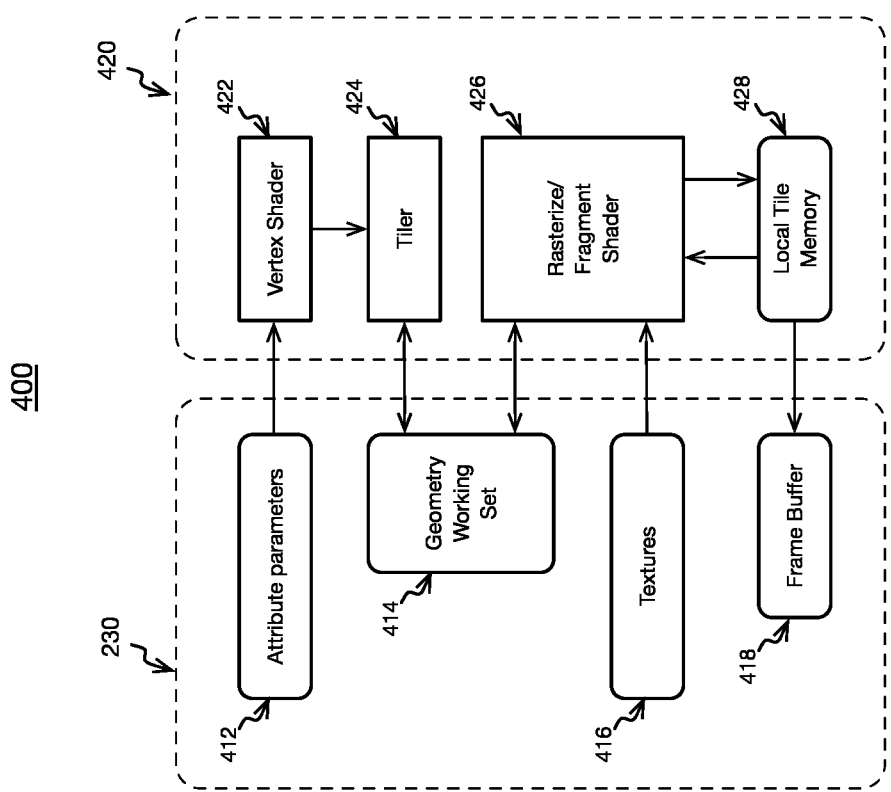
FIG. 4 is a diagram illustrating example interactions between a system memory and a graphics processing unit for graphics content processing, in accordance with embodiments.

FIG. 4 is a diagram 400 illustrating example interactions between a system memory, such as system memory 230, and various graphics processing operations, such as operations 420, that may be performed by a GPU, such as GPU 300. In an implementation, system memory 230 illustrated in FIG. 4 may correspond at least in part to memory 230 depicted in FIG. 2, for example. Further, example operations 420 depicted in diagram 400 may correspond at least in part with example graphics processing operations discussed above, such as in connection with FIG. 1 through FIG. 3. In an implementation, a graphics processing flow depicted in diagram 400 may be referred to as an index-driven vertex shading flow.

In an implementation, for a particular draw call in a particular render pass, vertex shader operation 422 and/or tiler operation 424 may obtain vertex attribute parameters 412 from system memory 230. Vertex attribute parameters may include, for example, position parameters and/or other type of attribute content specified by a particular draw call provided to GPU 300 from processor 210, for example. In an implementation, primitives specified by the particular draw call may be processed at least in part by one or more shader cores, such as shader core 322 and/or shader core 332. For example, a particular shader core, such as shader core 322, may perform position shading for vertices pertaining to specified primitives. Further, vertex shader operation 422 and/or tiler operation 424 may perform checks to the primitives to determine whether any of the primitive will not be visible, in an implementation. Vertex shader operation 422 and/or tiler operation 424 may cull primitives that will not be visible based at least in part on visibility checks, for example. Vertex shader operation 422 and/or tiler operation 424 may also perform varying shading operations for vertices of primitives to have survived the visibility checks. In an implementation, following the varying vertex shading operations, varying vertex attributes may be written to system memory 230. For example, varying vertex attributes may be stored in a geometry working set 414 within system memory 230.

Additionally, vertex shader operation 422 and/or tiler operation 424 may determine which tiles contain and/or are intersected by particular primitives. Tile lists may be generated and/or may be written to system memory 230. Position parameters for visible vertices may also be written to geometry working set 414 within system memory 230, for example.

In an implementation, once draw calls for a particular render pass have been completed and resulting shaded vertex content is stored in geometry working set 414, job control unit 310 may initialize rasterization and/or fragment shading operations 426. A particular shader core, such as shader core 322, may be instructed by job control unit 310 to process one or more particular tiles, for example. In an implementation, shader core 322, for example, may obtain vertex content for the one or more particular tiles from geometry working set 414 within system memory 230. Shader core 322 may further rasterize obtained vertex content based at least in part on vertex position parameters and/or other vertex attribute content to generate fragments, for example. In an implementation, fragments resulting from rasterization operations may be provided to shader core 322, for example, and shader core 322 may perform fragment shading operations. Textures 416 may be obtained from system memory 230, in an implementation. Further, for example, shaded fragments may be written to a tile buffer 428 stored in a local memory. For example, individual shader cores 322 and/or 332 may respectively comprise tile buffers to store shaded fragment content for particular tiles being processed. In an implementation, contents of tile buffer 428 may be written to a frame buffer 418 within system memory 230 for eventual display on a display device.

As mentioned, example diagram 420 depicts an example index driven vertex shading flow, including vertex attribute shading and vertex positional operations performed by vertex shading operation 422. Below, in connection with FIG. 5, for example, an example deferred vertex shading flow is generally described. For example, FIG. 5 depicts an example diagram 500 illustrating example interactions between system memory 230 and various graphics processing operations 520 that may be performed by a GPU, such as GPU 300. The example operations depicted in diagram 500 may correspond at least in part with example graphics processing operations discussed above. As mentioned, the graphics processing flow generally depicted in diagram 500 may be referred to as a deferred vertex shading flow. In some circumstances, deferred vertex shading may provide some advantages as compared with index driven vertex shading. For example, in some circumstances, accesses to system memory may be reduced and/or vertex shading operations may increase in efficiency.

In an implementation, for a particular draw call in a particular render pass, vertex shader operation 522 and/or tiler operation 524 may obtain vertex attribute parameters 512 from system memory 230. In an implementation, vertex shader operation 522 may comprise a relatively simplified vertex shading operation (e.g., no vertex attribute shading) wherein a shader core, such as shader core 322, may prepare vertex attribute parameters 512 (e.g., geometry content) for tiler operation 524. For example, vertex shader operation 522 may perform vertex positional operations and/or may provide vertex positional content to tiler operation 524. In an implementation, vertex shader operation 522 may not include attribute shading operations. As discussed more fully below, additional and/or more relatively compute-intensive vertex shading operations, such as vertex attribute shading, may be deferred to vertex shading operations 523 later in the graphics pipeline. For example, vertex shading operations 523 may be performed sometime after tiling operations, such as tiler operation 524.

In an implementation, vertex shader operation 522 and/or tiler operation 524 may include performing checks to determine whether particular primitives may not be visible and/or may cull some primitives in response to such determinations. In an implementation, vertex shader operation 522 and/or tiler operation 524 may determine which tiles contain and/or are intersected by particular primitives. Further, for example, tile lists may be generated. However, in contrast to an index driven vertex shading flow, the example deferred vertex shading flow depicted in diagram 500 may not include writing transformed positions and attribute parameters for visible vertices to system memory 230, in an implementation.

In an implementation, once draw calls for a particular render pass have been completed, job control unit 310, for example, may instruct a particular shader core, such as shader core 322, to process one or more tiles. In an implementation, shader core 322, for example, may obtain vertex content for the one or more particular tiles from geometry working set 514 within system memory 230. Further, in an implementation, vertex shader operations 523 and/or fragment shader operations 526 may analyze a stream of primitives pertaining to the tiles to be processed by a particular shader core, such as shader core 322. In an implementation, vertex shader operations 523 and/or fragment shader operations 526 may request shading for vertices used by the primitives. Further, in an implementation, a primitive stream may be held back until vertex shading has been completed for all vertices pertaining to the primitives of the primitive stream. Once all vertices for a particular primitive becomes available, the particular primitive may be output to the primitive stream.

Shader core 322, for example, may perform fragment shader operations 526 based at least in part on shaded vertex content provided as part of the primitive stream, in an implementation. Fragment shader operations 526 may also include textures 516 obtained from system memory 230, in an implementation. Further, shaded fragments may be written to a tile buffer 528 and/or contents of tile buffer 528 may be written to a frame buffer 518 within system memory 230 for eventual display on a display device, for example.

Figure 6:
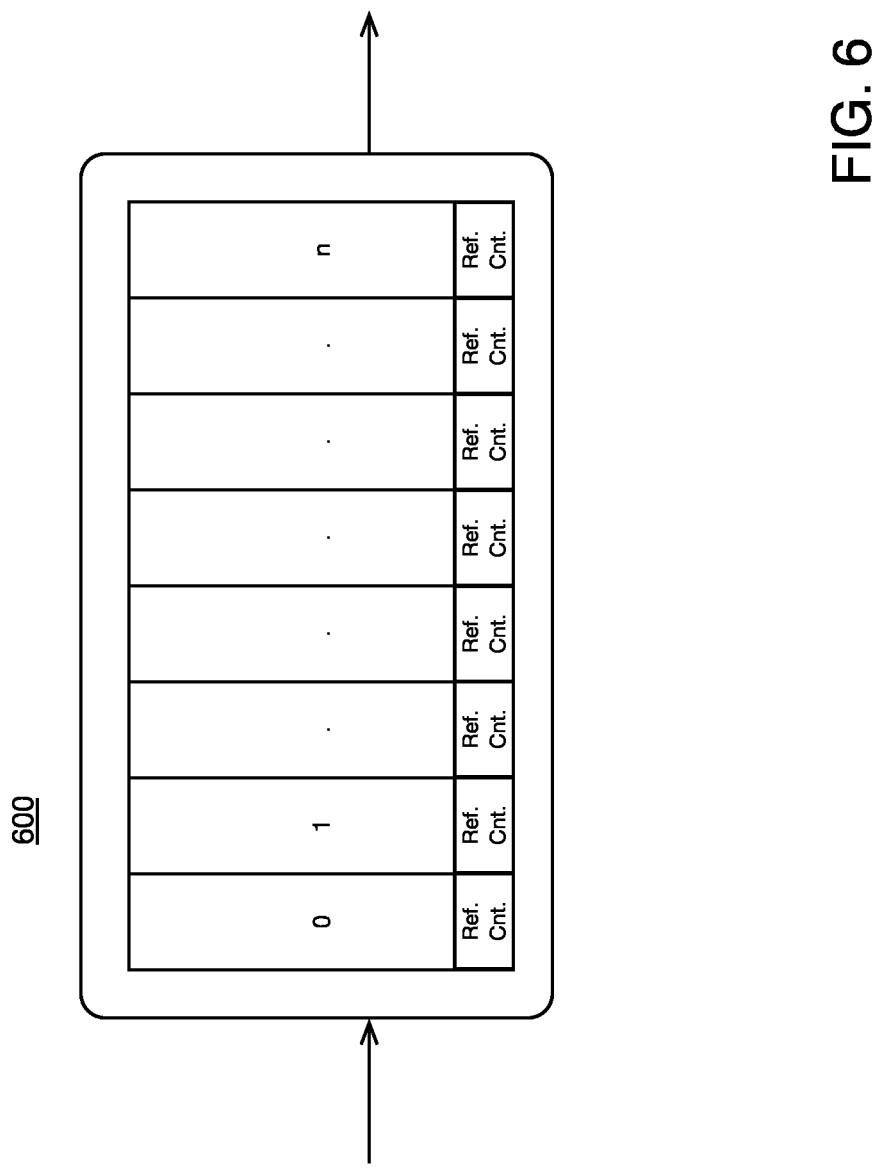
FIG. 6 is a schematic block diagram illustrating an example vertex buffer, in accordance with embodiments.

As discussed above, for some implementations at least some vertex shading may be performed following tiling operations and prior to fragment shading. As also mentioned, this example process may be referred to as deferred vertex shading. In implementations, a deferred vertex shading flow may in at least some circumstances result in improved vertex shading processing efficiency and/or may reduce the number of times system memory is accessed. In an implementation, vertex shading operations performed following tiling operations, such as vertex shading operations 523, may include the use of a vertex buffer, such as vertex buffer 600. Vertex buffer 600 is shown in diagram 500 and is also depicted in FIG. 6. In implementations, a plurality of vertex buffers, such as vertex buffer 600, may be local to respective shader cores. For example, vertex buffer 600 may be local to shader core 322 and a separate vertex buffer may be local to shader core 332. Also, for example, individual shader cores within shader stack 320 and/or shader stack 330 may include local vertex buffers. As discussed below, a vertex buffer, such as vertex buffer 600, may be utilized at least in part to store vertex content during deferred vertex shading operations to reduce accesses to system memory and/or to improve deferred vertex shading efficiency. In an implementation, vertex buffers, such as vertex buffer 600, may be memory-mapped. However, improved efficiency may be realized by keeping vertex content local the particular shader cores, for example. In an implementation, techniques may be employed to help ensure that vertex content does not spill over into system memory during deferred vertex shading and/or rasterization operations, for example.

As also previously mentioned, another example technique for improving deferred vertex shading efficiency and/or for reducing accesses to system memory may include reuse of previously shaded vertices in some circumstances. For example, in situations in which different primitives share one or more vertices, vertices previously shaded in connection with one primitive may be reused in the context of another primitive rather than re-shading every vertex. A sliding window buffer 900 shown in diagram 500 and also depicted in FIG. 9 may be utilized to track a number of recently allocated vertices, as discussed more fully below.

In an implementation, a deferred vertex shading flow, such as depicted in FIG. 5, for example, may reduce and/or eliminate accesses to system memory, such as compared with an index driven vertex shading flow. To reduce and/or eliminate accesses to system memory during deferred vertex shading and/or rasterization operations, it may be advantageous to maintain vertex content "on-chip". That is, for example, it may be advantageous to maintain vertex content in a memory that is local to respective shader cores. As mentioned, "memory local to a graphics processor" and/or the like refers to memory circuitry located on the same die and/or within the same semiconductor package as the graphics processor. Similarly, "memory local to a shader core" and/or the like refers to memory circuitry located on the same die and/or within the same semiconductor package as the shader core.

Building on the general graphics processing discussion provided above, embodiments are discussed below in which the tracking of vertices and the reuse of vertices may be decoupled. For example, a vertex buffer, such as vertex buffer 600, may be utilized to track a number of vertices during deferred vertex shading operations and/or a sliding window buffer, such as sliding window buffer 900, may be utilized to track a number of most recently used vertices. In implementations, individual shader cores may comprise respective vertex buffers and/or respective sliding window buffers. For example, shader core 322 may include a first vertex buffer and a first sliding window buffer and shader core 332 may include a second vertex buffer and a second sliding window buffer. A GPU, such as GPU 300, may include any number of shader cores and/or may include any number of vertex buffers and/or sliding window buffers, for example. In an implementation, a shader core, such as shader core 322 and/or shader core 332, may include a cache memory, such as a load/store cache, that may contain vertex buffer 600 and/or sliding window buffer 900, for example.

"Sliding window buffer" in this context refers to a buffer whose contents are adjusted such that it contains content pertaining to a specified number of most recently allocated vertices in a vertex buffer that are being utilized in current deferred vertex shading operations. For example, sliding window buffer 900 may contain content (e.g., metadata. See FIG. 9) pertaining to "N" vertices most recently allocated to vertex buffer 600 for utilization in current deferred vertex shading operations, such as may be performed by vertex shading operations 523, in an implementation.

FIG. 6 is a schematic block diagram illustrating an embodiment 600 of an example vertex buffer. In an implementation, vertex buffer 600 may by partitioned into a number of segments. For example, vertex buffer 600 may be partitioned into a number of equally-sized segments. In an implementation, vertex buffer 600 may comprise eight equally-sized segments, although subject matter is not limited in scope in these respects. Further, in an implementation, vertex buffer 600 may store 256 vertices per segment and/or individual vertices may utilize 16 bytes of storage within a particular segment. Of course, for other implementations, vertex buffer 600 may be configured to store different amounts and/or configurations of vertex content. In particular implementations, individual vertices may comprise a range of between 16 bytes to 256 bytes of position and/or attribute content as specified, for example, by a particular draw call. Again, subject matter is not limited in scope in these respects.

In an implementation, vertex buffer 600 may be assigned by a driver, such as driver 214, to a particular memory region local to a particular shader core, such as shader core 322, for example. In an implementation, vertex buffer 600 may have a fixed size that may be smaller than shader core's first level cache. For example, by limiting the size of vertex buffer 600 to that of a value smaller than the size of the shader core's cache, evictions from the cache may be reduced and/or minimized. In an implementation, individual segments of vertex buffer 600 may store vertex content for a number of primitives. Also, for example, vertex content for a particular primitive may be spread across multiple segments in some circumstances.

Further, in an implementation, individual segments of vertex cache 600 may include respective reference count parameters that may be utilized, for example, in allocating segments for vertex content storage. In an implementation, segments may be allocated by vertex control unit 700, for example, using modulo arithmetic. For example, vertex buffer 600 may comprise a first-in, first-out buffer and/or may be utilized in a circular manner. For example, memory within vertex buffer 600 may be allocated as needed with increasing addresses until the end of the buffer wherein allocation restarts from the beginning of the buffer. As mentioned, for vertex buffer 600 memory may be allocated on a segment-by-segment basis, in an implementation.

In an implementation, vertex buffer 600 may be initialized with all reference count parameters for the various segments set to zero. However, once the final segment (e.g., segment n) has been filled with vertex content and storage operations wrap back around to segment 0, the reference count for that particular segment may or may not have a value of zero. For a circumstance in which the reference count is non-zero, vertex control unit 700, for example, may wait until such time as the reference count returns to a value of zero. As described more fully below in connection with FIG. 8, a reference count parameter for a particular vertex buffer segment may be incremented whenever a primitive uses any of the vertices stored in the particular segment. Uses of vertices stored in vertex buffer 600, for example, may include initial storage of vertex content in the segment in connection with deferred shading operations for a particular primitive and/or may also include reuse of vertex content by another primitive, for example.

Further, a reference count parameter for a particular vertex buffer segment may be decremented whenever processing has completed for a primitive having associated vertex content stored in the particular segment. For example, processing of a primitive may be completed through culling and/or via finishing fragment shading associated with the primitive. In this manner, for example, a reference count parameter may be non-zero as relevant vertex content is being used to process particular primitives and may return to a zero value once fragment shading related to the particular primitives has completed.

Figure 7:
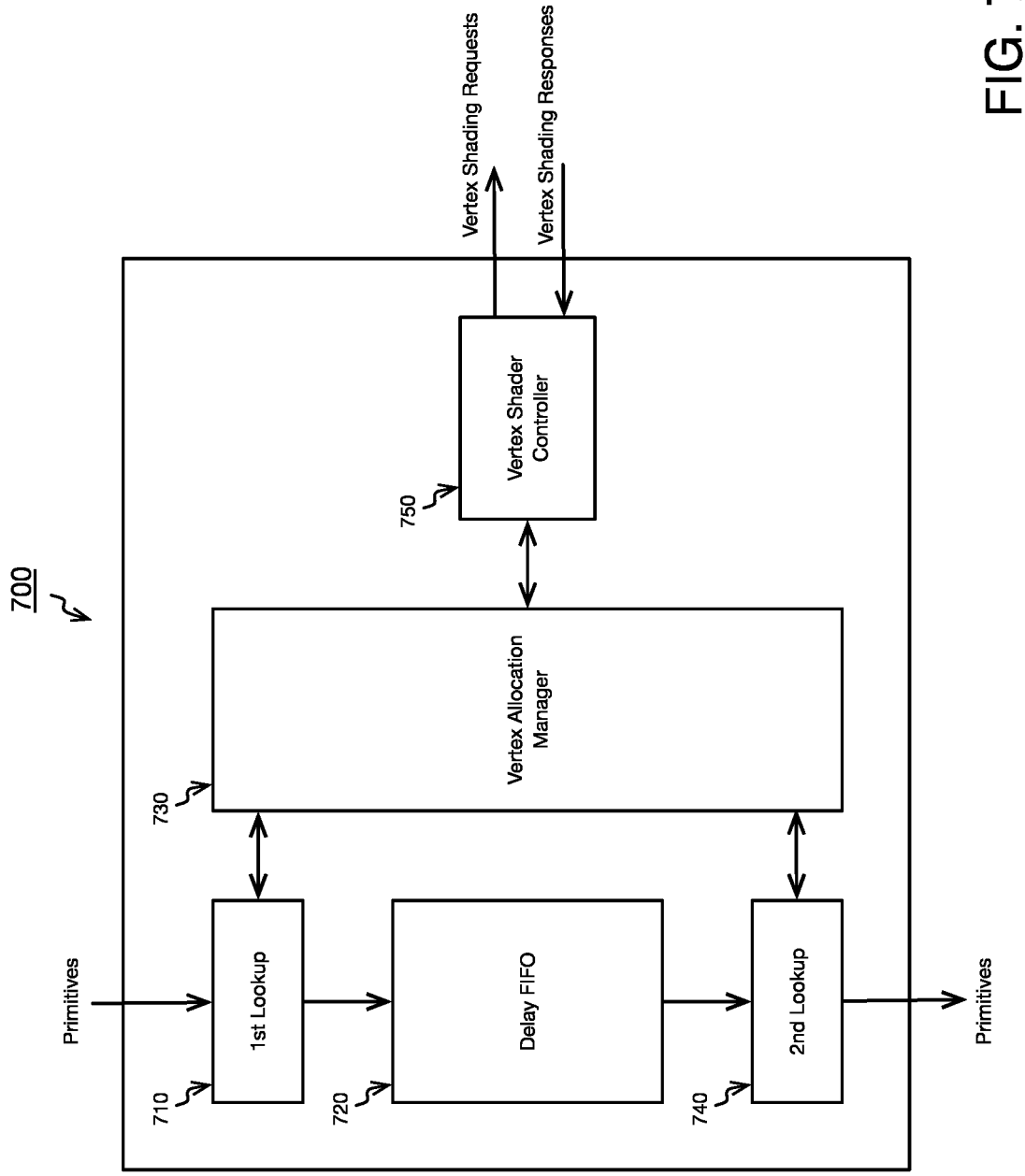
FIG. 7 is a schematic block diagram illustrating an example vertex control unit, in accordance with embodiments.

FIG. 7 is a schematic block diagram illustrating an embodiment of example vertex control unit 700. In an implementation, a GPU, such as GPU 300, may include a plurality of vertex control units that may be local to a respective plurality of shader cores. In an implementation, input and/or output primitives streams may be substantially similar. In an implementation, vertex control unit 700 may help to ensure that appropriate vertex content is available when a primitive is provided to a shader core, such as shader core 322, for fragment shading operations. In an implementation, a first look-up operation 710 may be performed, wherein vertex control unit 700 makes a determination as to whether any of the incoming vertices have been recently shaded. For example, a vertex allocation manager (VAM) 730 may check a sliding window buffer, such as sliding window buffer 900, to determine whether particular vertices have been recently shaded. For situations in which shading has not been recently performed for a particular vertex, vertex shader controller 750 may send appropriate shading requests to a shader core, such as shader core 322.

For circumstances in which first look-up operation 710 is not able to determine that a particular vertex has been recently shaded, VAM 730 may check vertex buffer 600 to determine whether allocatable memory is available, may allocate an amount of memory within a particular segment of vertex buffer 600 and/or may assign an internal identifier parameter to the particular vertex, in an implementation. VAM 730 may further add the particular vertex to a shading queue, for example.

Once first look-up operation 710 is performed, a primitive may be placed in a delay first-in, first-out (FIFO) buffer 720. Particular primitives placed in delay FIFO 720 may include newly shaded vertex content obtained by vertex shader controller 750 and/or may include recently shaded vertex content obtained by VAM 730 from sliding window buffer 900, in an implementation. Further, in an implementation, a primitive stream may be held back until vertex shading has been completed for vertices (e.g., all vertices) pertaining to the primitives of the primitive stream. A second look-up operation 740 may determine whether shaded vertex content (e.g., all shaded vertex content) for primitives to be output from delay FIFO 720 is available. Once shaded vertex content (e.g., all shaded vertex content) for the particular primitives is available, the particular primitives may be provided to a shader core, such as shader core 322, for fragment shading operations, for example.

In an implementation, VAM 730 of vertex control unit 700 may perform a number of functions. For example, VAM 730 may manage vertex buffer 600. In an implementation, VAM 730 may track the lifetime of entries within a particular vertex buffer so that VAM 730 may free up space appropriately. For example, VAM 730 may manage reference counts for respective segments of vertex buffer 600. VAM 730 may also track recently allocated vertices, such as via sliding window buffer 900, to be utilized in connection with first look-up operation 710. In an implementation, VAM 730 may also gather groups of vertices to be shaded and/or may form vertex packets so that full warps (e.g., sixteen vertices) may be delivered to a shader core for vertex shading, for example. VAM 730 may also translate vertex identifier and/or instance identifier parameters into internal identifiers that may be used to identify vertices stored in vertex buffer 600, for example, and/or to calculate offsets into particular segments of vertex buffer 600 to access particular stored vertex content. VAM 730 may additionally track outstanding shading requests, such as may be utilized for second look-up operation 740, for example. Of course, these are merely examples of operations and/or functions that may be performed by VAM 730 and subject matter is not limited in scope in these respects.

Figure 8:
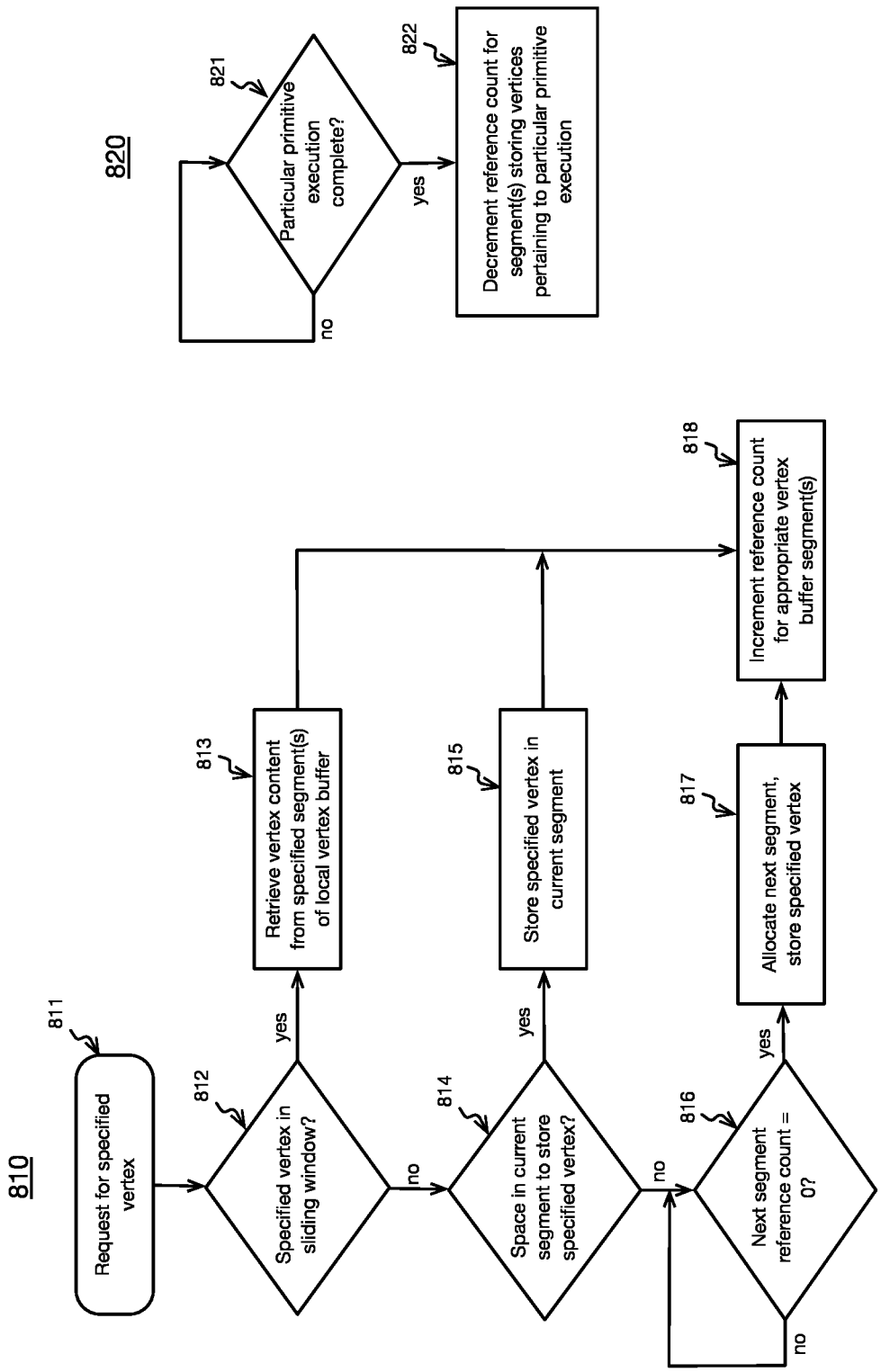
FIG. 8 is a flow diagram depicting an example process for tracking use of a vertex stored in a vertex buffer, in accordance with embodiments.

FIG. 8 depicts flow diagrams depicting embodiments 810 and 820 of example process for tracking use of vertex content stored in a segmented vertex buffer, such as segmented vertex buffer 600, for example. It should be noted that content acquired or produced, such as, for example, input signals, output signals, operations, results, etc. associated with example process 800 may be represented via one or more digital signals. It should also be appreciated that even though one or more operations are illustrated or described concurrently or with respect to a certain sequence, other sequences or concurrent operations may be employed. In addition, although the description below references particular aspects and/or features, one or more operations may be performed with other aspects and/or features.

In an implementation, operations depicted in example processes 810 and/or 820 may be performed at least in part by a particular VCU, such as VCU 700, local to a particular shader core, such as shader core 322. With respect to example process 810, a request may be made, such as by VAM 730, for example, to utilize one or more specified vertices in deferred vertex shading operations and/or fragment shading/rasterization operations, as indicated at block 811. In an implementation, responsive at least in part to the request for the one or more specified vertices, a check may be made as to whether metadata and/or other parameters pertaining to the one or more specified vertices are currently included in a particular sliding window buffer, such as sliding window buffer 900, local to the particular shader core, as indicated at block 812. As further indicated at block 813, in response to the metadata and/or other parameters pertaining to the one or more specified vertices being found to be stored in the sliding window buffer the metadata and/or other parameters pertaining to the one or more specified vertices may be utilized to retrieve appropriate vertex content from one or more particular segments of a particular vertex buffer, such as segmented vertex buffer 600, local to the particular shader core, in an implementation. Additionally, as indicated at block 818, responsive at least in part to accessing the specified vertex content from the specified segment(s) of the local vertex buffer, reference counts for the specified segment(s) may be incremented, in an implementation.

In an implementation, for situations in which metadata and/or other parameters pertaining to the one or more specified vertices are not currently stored in the sliding window buffer a check may be made, as indicated at block 814, as to whether a current segment of the local vertex buffer has enough available storage space to store the one or more specified vertices. As additionally indicated at block 815, if sufficient storage space is available to accommodate the one or more specified vertices in the current segment, the vertex content for the one or more specified vertices may be stored in the current segment, in an implementation. Further, storing vertex content in a particular segment of a local segmented vertex buffer, such as segmented vertex buffer 600, may initiate incrementation of the reference count for the particular segment as indicated at block 818. Additionally, the local sliding window buffer (e.g., sliding window buffer 900) may be updated to include metadata and/or other parameters pertaining to the one or more vertices stored at block 815, for example.

As indicated at block 816, for situations in which there is insufficient storage space available in a current segment of the local vertex buffer (e.g., segmented vertex buffer 600) to store the one or more specified vertices, a check may be made to determine whether a next segment of the local segmented vertex buffer has a reference count of "0" indicating that the particular segment is available for allocation, in an implementation. As indicated at block 817, if the check determines that the reference count for the next segment is "0" that particular segment may be allocated for storage of additional vertex content, for example. Additionally, a reference count for the new (i.e., "next") segment may be incremented responsive at least in part to the storage of the one or more specified vertices, in an implementation.

Example process 810 described above demonstrates some example circumstances in which a reference count for a particular segment of a vertex buffer (e.g., segmented vertex buffer 600) may be incremented. Example process 820, on the other hand, demonstrates an example circumstance in which a reference count for a particular segment of a vertex buffer may be decremented. In an implementation, and as depicted at blocks 821 and/or 822, reference counts for one or more particular segments storing vertex content pertaining to a particular primitive may be decremented at least in part in response to fragment shading and/or rasterization operations being completed for the particular primitive. As noted previously, and as indicated at block 816 if example process 810, a particular segment of a segmented vertex buffer may be available for allocation if the reference count for that particular segment is "0." Of course, processes 810 and/or 820 represent example implementations for managing reference counts and/or allocation of segments in a segmented vertex buffer (e.g., segmented vertex buffer 600), and subject matter is not limited in scope in these respects.

Although example processes 810 and/or 820 describe tracking a reference count parameter for a particular segment of a particular vertex buffer, subject matter is not limited in scope in these respects. For example, as mentioned, a GPU may include any number of shader cores and individual shader cores may include respective vertex buffers. In an implementation, respective vertex buffers may include a number of segments and individual segments may respectively include particular reference count parameters. Thus, VAM 730, for example, may manage reference count parameters for each of the individual reference count parameters for the various segments of a segmented vertex buffer, such as segmented vertex buffer 600.

Figure 9:
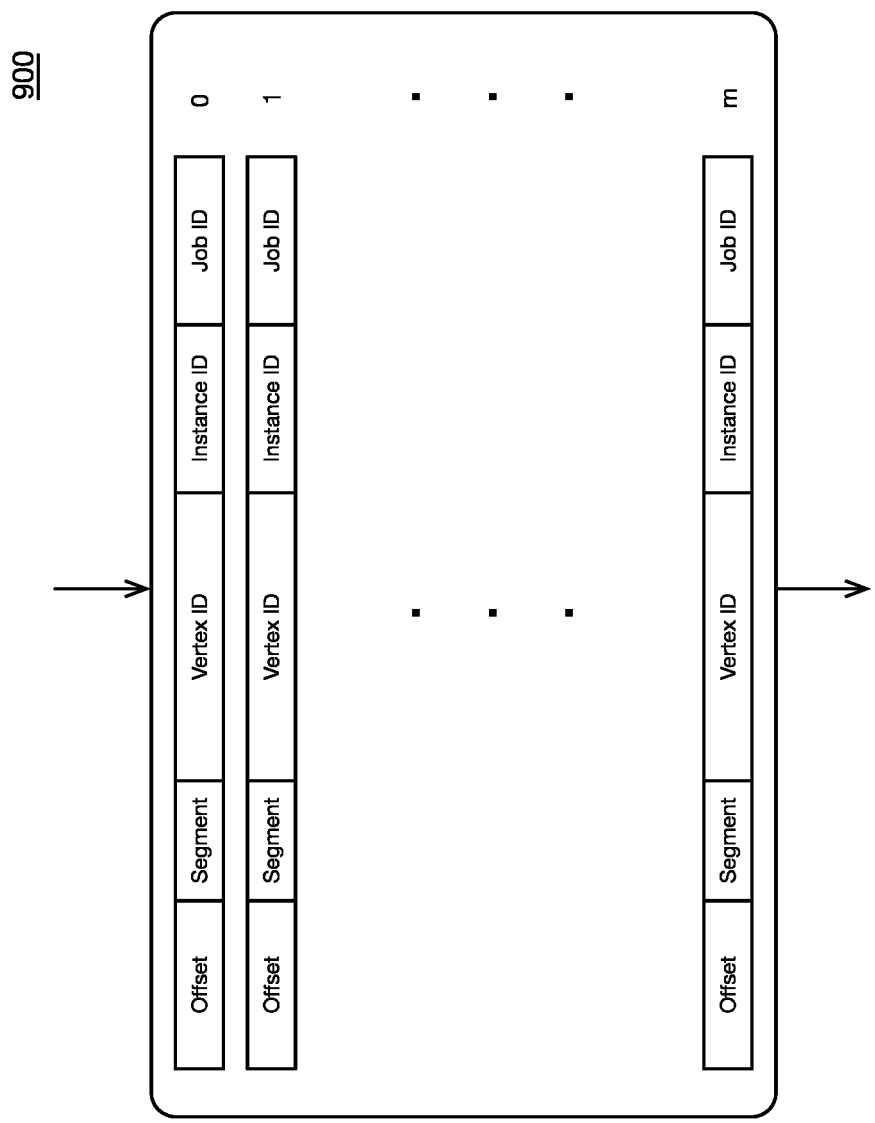
FIG. 9 is a schematic block diagram illustrating an example sliding window buffer, in accordance with embodiments.

FIG. 9 is a schematic block diagram illustrating example sliding window buffer 900. In an implementation, a sliding window buffer, such as sliding window buffer 900, may store shaded vertex content for 64 most recently used vertices. Of course, for other implementations, sliding window buffer 900 may store shaded vertex content for other numbers of vertices. In an implementation, sliding window buffer 900 may comprise a single entry per vertex. For example, sliding window buffer 900 may store for individual vertices a location of the particular vertex (e.g., offset into a particular segment of the vertex buffer), a segment identifier to identify a particular segment of a vertex buffer in which the particular vertex is stored, a vertex identifier, an instance identifier and/or a job identifier (e.g., draw call identifier). Of course, these are merely examples of parameters and/or other content that may be stored in a sliding window buffer, such as sliding window buffer 900.

In an implementation, sliding window buffer 900 may be smaller in size than vertex buffer 600. For example, reuse of shaded vertices may tend to occur over the most recent few vertices. In an implementation, storing shaded vertex content for 64 most recently used (e.g., shaded) vertices may result in as few as one or two percent, for example, of vertices sent for re-shading as a result of previously shaded vertices no longer residing in sliding window buffer 900. Further, larger sliding window buffers may result in more complicated and/or less efficient look-up operations (e.g., first look-up operation 710) and so forth. In implementations, relative and/or respective sizes of vertex buffer 600 and/or sliding window buffer 900 may be specified and/or adjusted based at least in part on particular use cases.

For example, relative and/or respective sizes of vertex buffer 600 and/or sliding window buffer 900 may be specified based at least in part on a number of factors including, for example, avoiding reuse of oldest vertices in vertex buffer 600. For example, ensuring that vertices from older segments of a vertex buffer are not reused may provide a relatively high likelihood that a next segment of the vertex buffer is available for allocation and/or storage of incoming vertices. In an implementation, relative and/or respective sizes of vertex buffer 600 and/or sliding window buffer 900 may be specified such that sliding window buffer 900 may store vertices from a current segment and one to three of the most recent segments of vertex buffer 600. Of course, subject matter is not limited in scope in these respects.

As mentioned previously, advantages may be realized with respect to reducing numbers of accesses of system memory during graphics content processing and/or with respect to improving efficiency of deferred shading operations, for example. As discussed above, such advantages may be realized in whole or in part by tracking availability of segments within a vertex buffer separately from tracking when vertices may be reused. For example, efforts to track every vertex in flight (e.g., all vertices related to current draw call) with a single, non-segmented buffer may utilize reference counters for each individual vertex. It would be impractical to implement such a scheme in hardware and software solutions would greatly increase the numbers of accesses to system memory, which would defeat a main purpose of tracking vertex content in the first place. On the other hand, example implementations such as those discussed herein may reduce amounts of vertex related content to be stored and/or tracked. Example implementations described herein may strike a balance between a number of segments of a vertex buffer and an amount of content to be stored and/or tracked.

Figure 10:
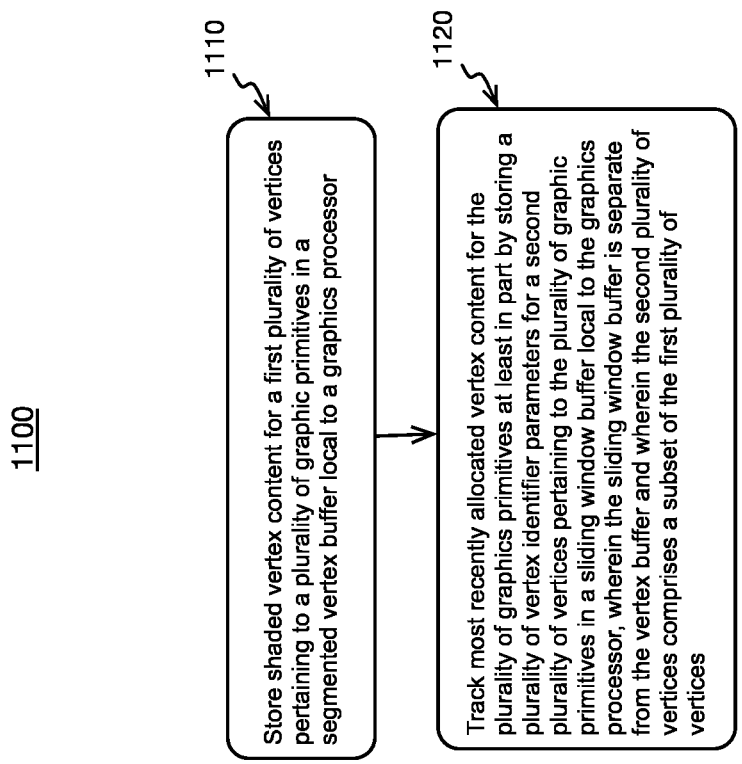
FIG. 10 is a flow diagram depicting an example process for processing graphics content via an index driven vertex shading flow and/or via a deferred vertex shading flow, in accordance with embodiments.

FIG. 10 is a flow diagram depicting an embodiment 1100 of an example process for processing graphics content including use of a vertex buffer and a sliding window buffer, in an implementation. It should be noted that content acquired or produced, such as, for example, input signals, output signals, operations, results, etc. associated with example process 1100 may be represented via one or more digital signals. It should also be appreciated that even though one or more operations are illustrated or described concurrently or with respect to a certain sequence, other sequences or concurrent operations may be employed. In addition, although the description below references particular aspects and/or features, one or more operations may be performed with other aspects and/or features.

In an implementation, to help bring about advantages related to vertex shading operations such as, for example, reducing numbers of accesses to system memory during graphics content processing and/or improving efficiency of deferred shading operations, tracking availability of segments within a vertex buffer may be performed separately from tracking availability of vertices for reuse. As indicated at block 1110, an example process may include storing shaded vertex content for a first plurality of vertices pertaining to a plurality of graphics primitives in a vertex buffer, such as vertex buffer 600, local to a graphics processor, such as GPU 300, for example. In an implementation, as indicated at block 1120, an example process may also include tracking most recently used vertex content for the plurality of graphics primitives at least in part by storing a plurality of vertex identifier parameters for a second plurality of vertices pertaining to the plurality of graphics primitives in a sliding window buffer, such as sliding window buffer 900, local to the graphics processor, such as GPU 300, wherein the sliding window buffer is separate from the vertex buffer and wherein the second plurality of vertices comprises a subset of the first plurality of vertices.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

A "signal measurement" and/or a "signal measurement vector" may be referred to respectively as a "random measurement" and/or a "random vector," such that the term "random" may be understood in context with respect to the fields of probability, random variables and/or stochastic processes. A random vector may be generated by having measurement signal components comprising one or more random variables. Random variables may comprise signal value measurements, which may, for example, be specified in a space of outcomes. Thus, in some contexts, a probability (e.g., likelihood) may be assigned to outcomes, as often may be used in connection with approaches employing probability and/or statistics. In other contexts, a random variable may be substantially in accordance with a measurement comprising a deterministic measurement value or, perhaps, an average measurement component plus random variation about a measurement average. The terms "measurement vector," "random vector," and/or "vector" are used throughout this document interchangeably. In an embodiment, a random vector, or portion thereof, comprising one or more measurement vectors may uniquely be associated with a distribution of scalar numerical values, such as random scalar numerical values (e.g., signal values and/or signal sample values), for example. Thus, it is understood, of course, that a distribution of scalar numerical values, for example, without loss of generality, substantially in accordance with the foregoing description and/or later description, is related to physical measurements, and is likewise understood to exist as physical signals and/or physical signal samples.

The terms "correspond", "reference", "associate", and/or similar terms relate to signals, signal samples and/or states, e.g., components of a signal measurement vector, which may be stored in memory and/or employed with operations to generate results, depending, at least in part, on the above-mentioned, signal samples and/or signal sample states. For example, a signal sample measurement vector may be stored in a memory location and further referenced wherein such a reference may be embodied and/or described as a stored relationship. A stored relationship may be employed by associating (e.g., relating) one or more memory addresses to one or more another memory addresses, for example, and may facilitate an operation, involving, at least in part, a combination of signal samples and/or states stored in memory, such as for processing by a processor and/or similar device, for example. Thus, in a particular context, "associating," "referencing," and/or "corresponding" may, for example, refer to an executable process of accessing memory contents of two or more memory locations, e.g., to facilitate execution of one or more operations among signal samples and/or states, wherein one or more results of the one or more operations may likewise be employed for additional processing, such as in other operations, or may be stored in the same or other memory locations, as may, for example, be directed by executable instructions. Furthermore, terms "fetching" and "reading" or "storing" and "writing" are to be understood as interchangeable terms for the respective operations, e.g., a result may be fetched (or read) from a memory location; likewise, a result may be stored in (or written to) a memory location.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Figure 11:
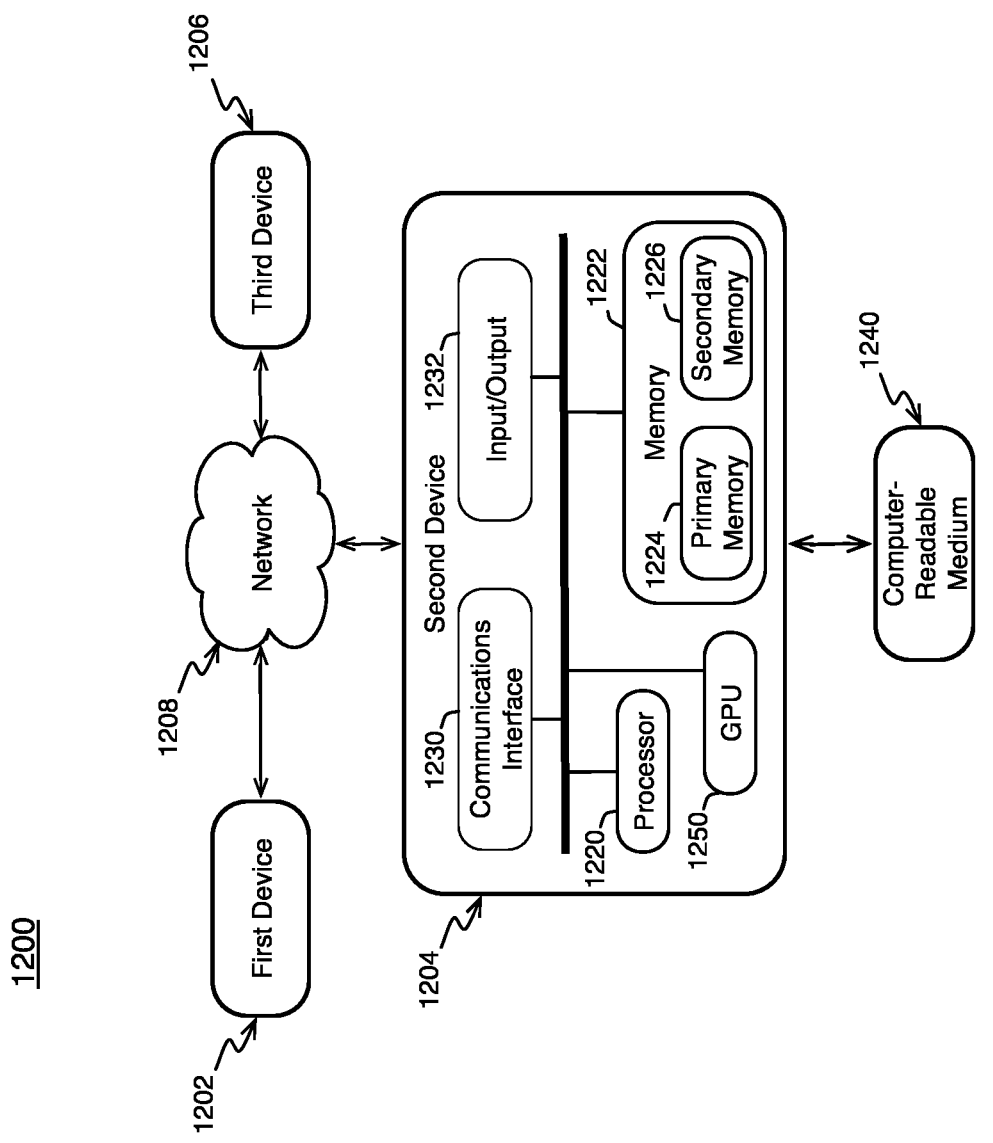
FIG. 11 is a schematic diagram illustrating an example computing environment, in accordance with embodiments.

In one example embodiment, as shown in FIG. 11, a system embodiment may comprise a local network (e.g., device 1204 and medium 1240) and/or another type of network, such as a computing and/or communications network. For purposes of illustration, therefore, FIG. 11 shows an embodiment 1200 of a system that may be employed to implement either type or both types of networks. Network 1208 may comprise one or more network connections, links, processes, services, applications, and/or resources to facilitate and/or support communications, such as an exchange of communication signals, for example, between a computing device, such as 1202, and another computing device, such as 1206, which may, for example, comprise one or more client computing devices and/or one or more server computing device. By way of example, but not limitation, network 1208 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 11 may comprise features, for example, of a client computing device and/or a remote/server computing device, in an embodiment. It is further noted that the term computing device, in general, whether employed as a client and/or as a server, or otherwise, refers at least to a processor and a memory connected by a communication bus. A "processor," for example, is understood to connote a specific structure such as a central processing unit (CPU) of a computing device which may include a control unit and an execution unit. In an aspect, a processor may comprise a device that interprets and executes instructions to process input signals to provide output signals. As such, in the context of the present patent application at least, computing device and/or processor are understood to refer to sufficient structure within the meaning of 35 USC § 112 (f) so that it is specifically intended that 35 USC § 112 (f) not be implicated by use of the term "computing device," "processor" and/or similar terms; however, if it is determined, for some reason not immediately apparent, that the foregoing understanding cannot stand and that 35 USC § 112 (f), therefore, necessarily is implicated by the use of the term "computing device," "processor" and/or similar terms, then, it is intended, pursuant to that statutory section, that corresponding structure, material and/or acts for performing one or more functions be understood and be interpreted to be described at least in FIGS. 1-10 and in the text associated with the foregoing figure(s) of the present patent application.

Referring now to FIG. 11, in an embodiment, first and third devices 1202 and 1206 may be capable of rendering a graphical user interface (GUI) for a network device and/or a computing device, for example, so that a user-operator may engage in system use. Device 1204 may potentially serve a similar function in this illustration. Likewise, in FIG. 11, computing device 1202 ('first device' in figure) may interface with computing device 1204 ('second device' in figure), which may, for example, also comprise features of a client computing device and/or a remote and/or server computing device, in an embodiment. Processor (e.g., processing device) 1220 and memory 1222, which may comprise primary memory 1224 and secondary memory 1226, may communicate by way of a communication bus 1215, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 1204, as depicted in FIG. 11, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

In FIG. 11, computing device 1202 may provide one or more sources of executable computer instructions in the form physical states and/or signals (e.g., stored in memory states), for example. Computing device 1202 may communicate with computing device 1204 by way of a network connection, such as via network 1208, for example. As previously mentioned, a connection, while physical, may not necessarily be tangible. Although computing device 1204 of FIG. 11 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1222 may comprise any non-transitory storage mechanism. Memory 1222 may comprise, for example, primary memory 1224 and secondary memory 1226, additional memory circuits, mechanisms, or combinations thereof may be used. Memory 1222 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1222 may be utilized to store a program of executable computer instructions. For example, processor 1220 may fetch executable instructions from memory and proceed to execute the fetched instructions. Memory 1222 may also comprise a memory controller for accessing device readable-medium 1240 that may carry and/or make accessible digital content, which may include code, and/or instructions, for example, executable by processor 1220 and/or some other device, such as a controller, as one example, capable of executing computer instructions, for example. Under direction of processor 1220, a non-transitory memory, such as memory cells storing physical states (e.g., memory states), comprising, for example, a program of executable computer instructions, may be executed by processor 1220 and able to generate signals to be communicated via a network, for example, as previously described. Generated signals may also be stored in memory, also previously suggested.

Memory 1222 may store electronic files and/or electronic documents, such as relating to one or more users, and may also comprise a computer-readable medium that may carry and/or make accessible content, including code and/or instructions, for example, executable by processor 1220 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 11, processor 1220 may comprise one or more circuits, such as digital circuits, to perform at least a portion of a computing procedure and/or process. By way of example, but not limitation, processor 1220 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1220 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 11 also illustrates device 1204 as including a component 1232 operable with input/output devices, for example, so that signals and/or states may be appropriately communicated between devices, such as device 1204 and an input device and/or device 1204 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising: processing a plurality of graphics primitives utilizing a graphics processor, including:
storing shaded vertex content for a first plurality of vertices pertaining to the plurality of graphic primitives in a segmented vertex buffer local to the graphics processor; and
tracking most recently allocated vertex content for the plurality of graphics primitives at least in part by storing a plurality of vertex identifier parameters for a second plurality of vertices pertaining to the plurality of graphic primitives in a sliding window buffer local to the graphics processor, wherein the sliding window buffer is separate from the segmented vertex buffer and wherein the second plurality of vertices comprises a subset of the first plurality of vertices, wherein the tracking the most recently allocated vertex content for the plurality of graphic primitives comprises storing in the sliding window buffer parameters representative of offsets into one or more particular segments of the segmented vertex buffer for the respective second plurality of vertices.

2. The method of claim 1, wherein the segmented vertex buffer comprises a plurality of equally-sized segments.

3. The method of claim 2, wherein the storing the shaded vertex content for the first plurality of vertices in the segmented vertex buffer comprises storing one or more vertices for a first primitive in a first segment of the plurality of segments of the segmented vertex buffer.

4. The method of claim 3, further comprising incrementing a reference count parameter for the first segment of the segmented vertex buffer responsive at least in part to the storing the one or more vertices for the first primitive in the first segment of the segmented vertex buffer.

5. The method of claim 4, further comprising decrementing a reference count parameter for the first segment of the segmented vertex buffer responsive at least in part to a completion of fragment shading operations pertaining to the one or more vertices for the first primitive.

6. The method of claim 2, wherein the storing the shaded vertex content for the first plurality of vertices in the segmented vertex buffer comprises allocating a particular segment of the plurality of segments at least in part by determining whether a reference count for the particular segment is zero.

7. The method of claim 1, wherein the tracking the most recently used vertex content for the plurality of graphic primitives comprises removing from the sliding window buffer vertex identifier parameters for vertices stored in a particular segment of the segmented vertex buffer at least in part in response to a reference count parameter for the particular segment decremented to a value of zero.

8. The method of claim 1, wherein the tracking the most recently allocated vertex content for the plurality of graphic primitives comprises storing segmented vertex buffer segment identifier parameters in the sliding window buffer for the respective second plurality of vertices.

9. An apparatus, comprising:
a processor to include a plurality of shader cores to process a plurality of graphics primitives; and
a plurality of respective vertex buffers local to the respective plurality of shader cores, wherein the plurality of shader cores further to include a plurality of respective sliding window buffers, wherein the plurality of sliding window buffers are separate from the plurality of vertex buffers, and wherein the processor to:
initiate storage of shaded vertex content for a first plurality of vertices pertaining to the plurality of graphic primitives in a first vertex buffer of the plurality of vertex buffers; and
track most recently allocated vertex content for the plurality of graphics primitives at least in part via storage of a plurality of vertex identifier parameters for a second plurality of vertices pertaining to the plurality of graphic primitives in a first sliding window buffer of the plurality of sliding window buffers, wherein the second plurality of vertices comprises a subset of the first plurality of vertices.

10. The apparatus of claim 9, wherein the first vertex buffer to comprise a plurality of equally-sized segments.

11. The apparatus of claim 10, wherein, to initiate storage of the shaded vertex content for the first plurality of vertices in the first vertex buffer, the processor to initiate storage of one or more vertices for a first primitive in a first segment of the plurality of segments of the first vertex buffer.

12. The apparatus of claim 11, wherein the processor further to increment a reference count parameter for the first segment of the first vertex buffer responsive at least in part to storage of the one or more vertices for the first primitive in the first segment of the first vertex buffer.

13. The apparatus of claim 12, wherein the processor further to decrement a reference count parameter for the first segment of the first vertex buffer responsive at least in part to a completion of fragment shading operations pertaining to the one or more vertices for the first primitive.

14. The apparatus of claim 10, wherein, to initiate storage of the shaded vertex content for the first plurality of vertices in the first vertex buffer, the processor to allocate a particular segment of the plurality of segments at least in part via a determination as to whether a reference count for the particular segment is zero.

15. The apparatus of claim 9, wherein, to track the most recently allocated vertex content for the plurality of graphic primitives, the processor to initiate removal from the first sliding window buffer vertex identifier parameters for vertices stored in a particular segment of the first vertex buffer at least in part in response to a reference count parameter for the particular segment decremented to a value of zero.

16. The apparatus of claim 9, wherein, to track the most recently allocated vertex content for the plurality of graphic primitives, the processor to initiate storage of vertex buffer segment identifier parameters in the first sliding window buffer for the respective second plurality of vertices.

17. The apparatus of claim 9, wherein, to track the most recently allocated vertex content for the plurality of graphic primitives, the processor to initiate storage in the first sliding window of buffer parameters representative of offsets into one or more particular segments of the first vertex buffer for the respective second plurality of vertices.

18. A method, comprising: processing a plurality of graphics primitives utilizing a graphics processor, including:
   storing shaded vertex content for a first plurality of vertices pertaining to the plurality of graphic primitives in a segmented vertex buffer local to the graphics processor;
   tracking most recently allocated vertex content for the plurality of graphics primitives at least in part by storing a plurality of vertex identifier parameters for a second plurality of vertices pertaining to the plurality of graphic primitives in a sliding window buffer local to the graphics processor, wherein the sliding window buffer is separate from the segmented vertex buffer and wherein the second plurality of vertices comprises a subset of the first plurality of vertices, wherein the tracking the most recently allocated vertex content for the plurality of graphic primitives comprises storing in the sliding window buffer parameters representative of offsets into one or more segments of the segmented vertex buffer for the respective second plurality of vertices; and
   incrementing a reference count parameter for a first segment of the one or more segments of the segmented vertex buffer responsive at least in part to a storing of one or more vertices for a first primitive of the plurality of graphics primitives in the first segment of the one or more segments of the segmented vertex buffer.

19. The method of claim 18, further comprising decrementing a reference count parameter for the first segment of the one or more segments of the segmented vertex buffer responsive at least in part to a completion of fragment shading operations pertaining to the one or more vertices for the first primitive.

* * * * *